United States Patent [19]
McDonald

[11] Patent Number: 5,102,154
[45] Date of Patent: Apr. 7, 1992

[54] MASONRY BLOCK DOLLY

[76] Inventor: Jeff B. McDonald, 22693 Eyota Rd., Apple Valley, Calif. 92307

[21] Appl. No.: 541,314

[22] Filed: Jun. 21, 1990

[51] Int. Cl.⁵ .............................................. B62B 1/04
[52] U.S. Cl. ............................. 280/47.27; 280/47.18; 280/47.24; 294/62
[58] Field of Search ............... 280/47.27, 47.28, 47.29, 280/47.18, 47.19, 47.24, 79.3, 79.4, 79.6, 79.7; 248/172; 294/15, 62, 63.1, 67.2, 67.22; 414/900

[56] References Cited

U.S. PATENT DOCUMENTS

| | | | |
|---|---|---|---|
| 1,374,986 | 4/1921 | Carter | 280/79.4 |
| 2,721,086 | 10/1955 | Gorley et al. | 280/47.29 |
| 2,869,886 | 1/1959 | Wardell | 280/47.18 |
| 3,580,346 | 5/1971 | McLaren | 280/47.24 |
| 3,693,996 | 9/1972 | Hardy | 280/79.3 |
| 3,718,337 | 2/1973 | Vosbikian et al. | 280/47.26 |
| 4,220,346 | 9/1980 | Geschwender | 280/47.34 |
| 4,358,124 | 11/1982 | Geschwender | 280/47.34 |
| 4,752,173 | 6/1988 | Fleming | 280/47.34 |
| 4,793,624 | 12/1988 | Mace | 280/79.7 |

FOREIGN PATENT DOCUMENTS

| | | | |
|---|---|---|---|
| 696854 | 10/1965 | Italy | 280/47.29 |
| 749545 | 5/1956 | United Kingdom | 280/47.29 |
| 894253 | 4/1962 | United Kingdom | 280/47.29 |

Primary Examiner—Andres Kashnikow
Assistant Examiner—Eric Culbreth
Attorney, Agent, or Firm—Leon Gilden

[57] ABSTRACT

An apparatus including a rectangular, vertical framework, including a series of spaced vertical bars to define a grid, with a lower slotted support bar and an upper bar enclosing the framework, wherein the bottom slotted bar includes a plurality of orthogonally and slidably mounted support legs adjustably positionable to accommodate various sized masonry block to direct the legs through the apertures within the block. Pneumatic tires of an enlarged diameter, such as two 4.80×400-8 inch two ply air tires are mounted rearwardly and below an intersection defined by the legs and the rectangular framework and to each side of the rectangular framework to afford stability to the organization. An accessory locking frame is mounted within the outwardly extending legs and affords a degree of flexure to enable securement of stacked masonry block to the dolly.

3 Claims, 4 Drawing Sheets

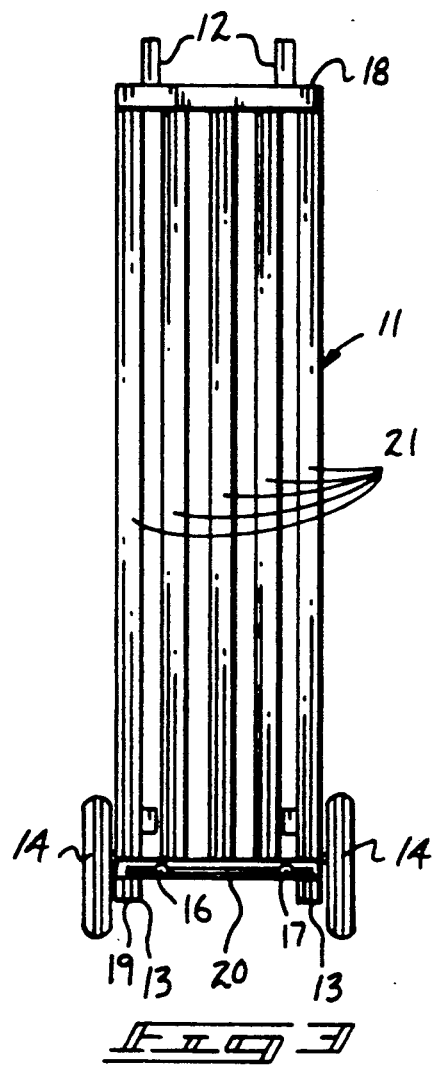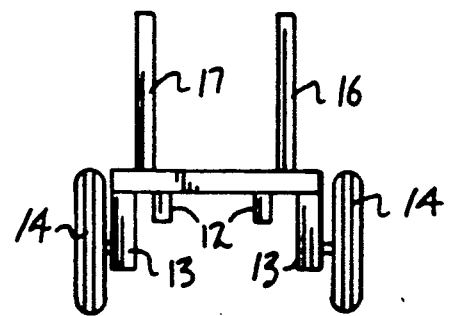

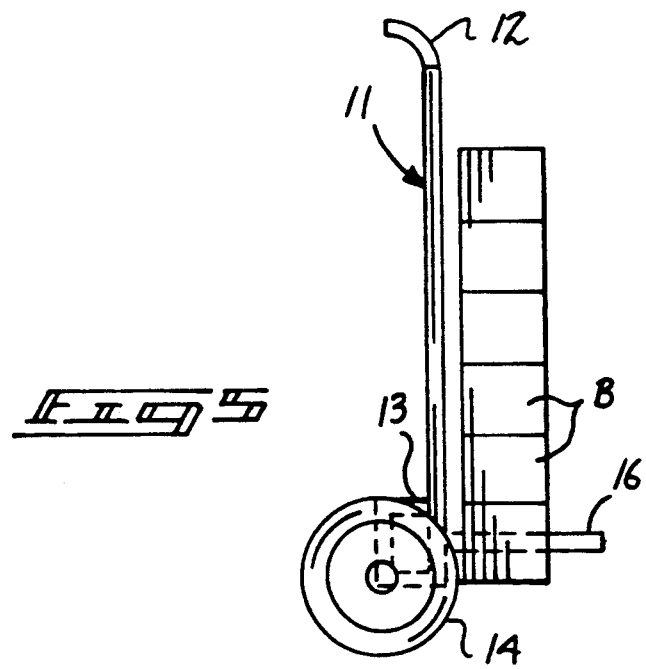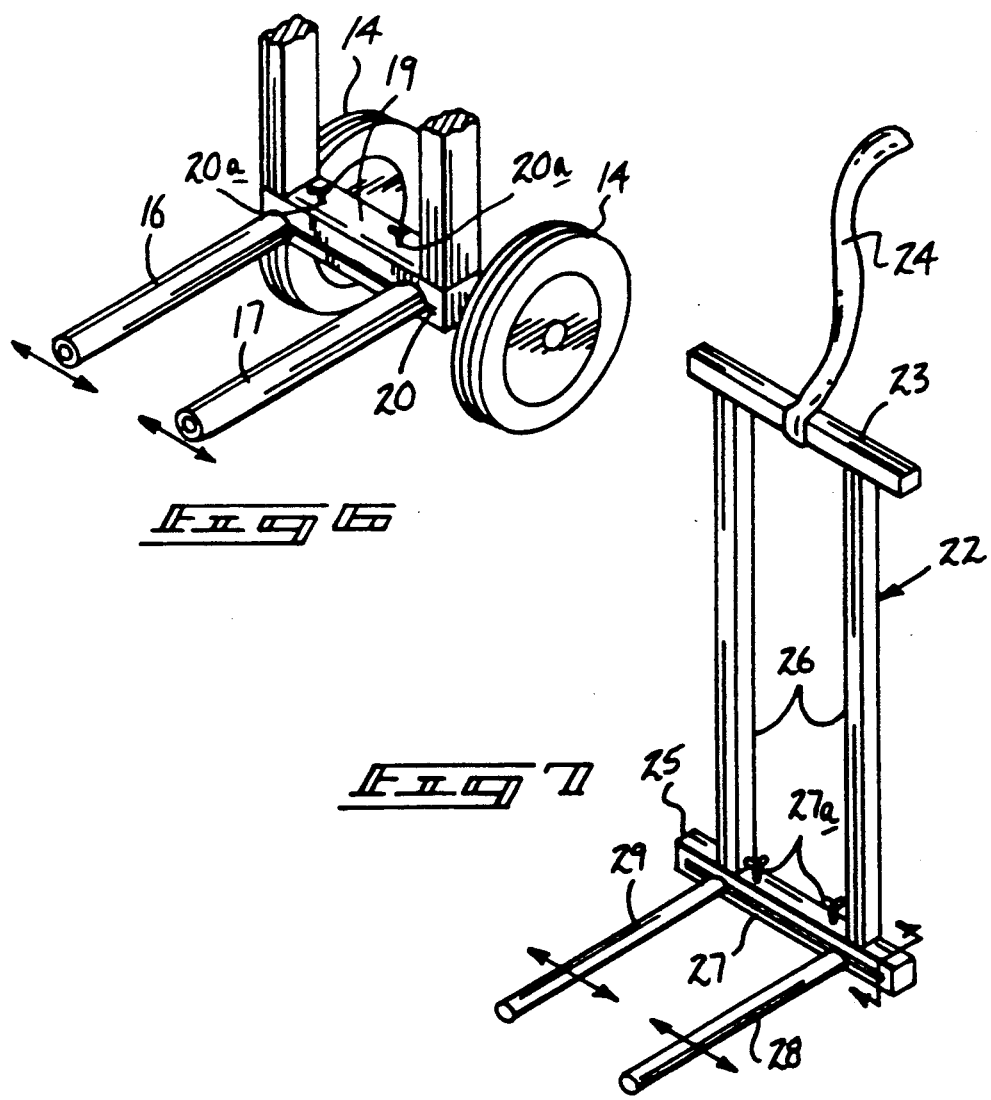

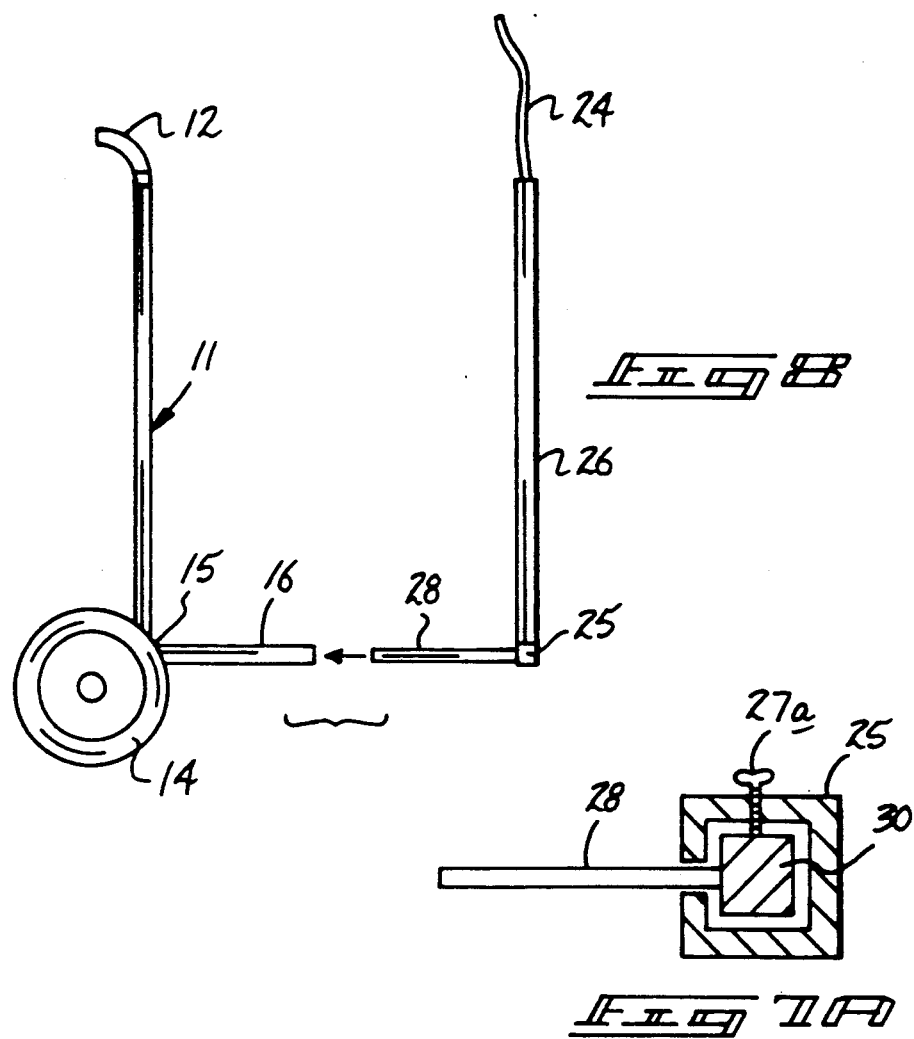
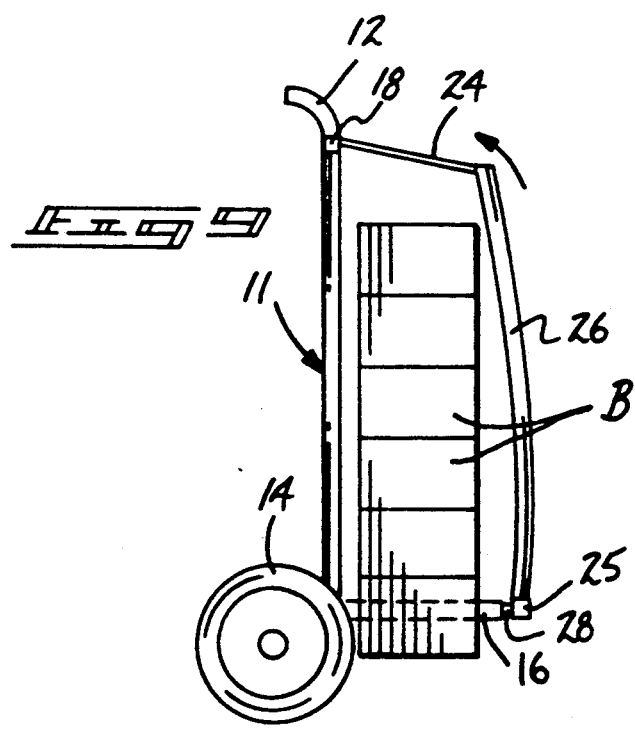

MASONRY BLOCK DOLLY

BACKGROUND OF THE INVENTION

1. Field of the Invention

The field of invention relates to hand truck apparatus, and more particularly pertains to a new and improved masonry block dolly apparatus wherein the same includes spaced support legs to accomodate variously sized masonry block to interfit within the spaced apertures of such block for transport of the same.

2. Description of the Prior Art

The use of hand truck apparatus directed to various needs to enable manual movement and repositioning of large quantities of bulk items is known in the prior art. Heretofore, however, hand truck apparatus has not been directed to the convenient and ready transport of masonry block. Such masonry block is formed with spaced apertures and due to the relatively brittle nature of such block as construction material, they are subject to damage during movement. Examples of prior art hand truck apparatus include U.S. Pat. No. 3,693,996 to Hardy setting forth a hand truck for generic application to transport a variety of items, and is defined by a ladder type framework mounting fixed lower legs to support a variety of items thereon, and further including a rear carriage to enable a rolling transport of such items.

U.S. Pat. No. 4,793,624 to Mace illustrates a hand truck formed with a bottom fixed platform oriented relative to a vertical framework to enable transport of a variety of large planar objects.

U.S. Pat. No. 4,752,173 to Fleming sets forth a hand truck again utilizing a fixed lower platform, but incorporating a strap member to secure enlarged items to the truck organization.

U.S. Pat. No. 4,220,346 to Greschwender sets forth a utility type cart or hand truck with a lower support plate mounted to accommodate objects to be transported thereon and adapted to receive a rigid framework in a spaced relationship relative to the vertical framework of the hand truck.

U.S. Pat. No. 4,358,124 also to Greschwender is illustrative of a further example of the hand truck with a lower platform mounted to vertical legs that are reciprocatably mounted relative to the hand truck for support of various items thereon.

As such, it may be appreciated that there is a continuing need for a new and improved masonry block dolly apparatus wherein the same addresses both the problems of ease of accommodating and adjusting the support legs of the dolly to be directed through and support masonry blocks thereon, and in this respect, the present invention substantially fulfills this need.

SUMMARY OF THE INVENTION

In view of the foregoing disadvantages inherent in the known types of hand truck apparatus now present in the prior art, the present invention provides a masonry block dolly wherein the same is provided to accommodate in an adjustable manner various sized masonry block construction materials. As such, the general purpose of the present invention, which will be described subsequently in greater detail, is to provide a new and improved masonry block dolly which has all the advantages of the prior art hand truck apparatus and none of the disadvantages.

To attain this, the present invention provides an apparatus including a rectangular, vertical framework, including a series of spaced vertical bars to define a grid, with a lower slotted support bar and an upper bar enclosing the framework, wherein the bottom slotted bar includes a plurality of orthogonally and slidably mounted support legs adjustably positionable to accommodate various sized masonry block to direct the legs through the apertures within the block. Two 4.80×400×8 inch two ply tires are mounted rearwardly and below an intersection defined by the legs and the rectangular framework and to each side of the rectangular framework to afford stability to the organization. An accessory locking frame is mounted within the outwardly extending legs and affords a degree of flexure to enable securement of stacked masonry block to the hand truck.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved masonry block dolly apparatus which has all the advantages of the prior art dolly apparatus and none of the disadvantages.

It is another object of the present invention to provide a new and improved masonry block dolly apparatus which may be easily and efficiently manufactured and marketed.

It is a further object of the present invention to provide a new and improved masonry block dolly apparatus which is of a durable and reliable construction.

An even further object of the present invention is to provide a new and improved masonry block dolly apparatus which is susceptible of a low cost of manufacture with regard to both materials and labor, and which accordingly is then susceptible of low prices of sale to the consuming public, thereby making such masonry block dolly apparatus economically available to the buying public.

Still yet another object of the present invention is to provide a new and improved masonry block dolly apparatus which provides in the apparatuses and methods of the prior art some of the advantages thereof, while simultaneously overcoming some of the disadvantages normally associated therewith.

Still another object of the present invention is to provide a new and improved masonry block dolly apparatus wherein the same utilizes adjustable lower legs to enable a variance of spacing therebetween to be directed interiorly of a lowermost masonry block of a stack of masonry blocks for convenience of transport of such block members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic frontal view taken in elevation of the instant invention.

FIG. 4 is an orthographic top view of the instant invention.

FIG. 5 is an orthographic side view of the instant invention illustrated as directed through a lowermost masonry block for support of a stack of such block members.

FIG. 6 is an isometric partial view of the support legs of the instant invention in association with the vertical framework.

FIG. 7 is an isometric illustration of a locking frame utilized by the instant invention.

FIG. 8 is an orthographic side view taken in elevation of the locking frame in association with the hand truck of the instant invention.

FIG. 7a is an orthographic view taken along the lines 7a-7a of the instant invention.

FIG. 9 is an orthogaphic side view taken in elevation of the hand truck and locking frame in cooperation with a stack of masonry block.

DESCRIPTION OF THE PREFERRED EMBODIMENT

Figure 1:
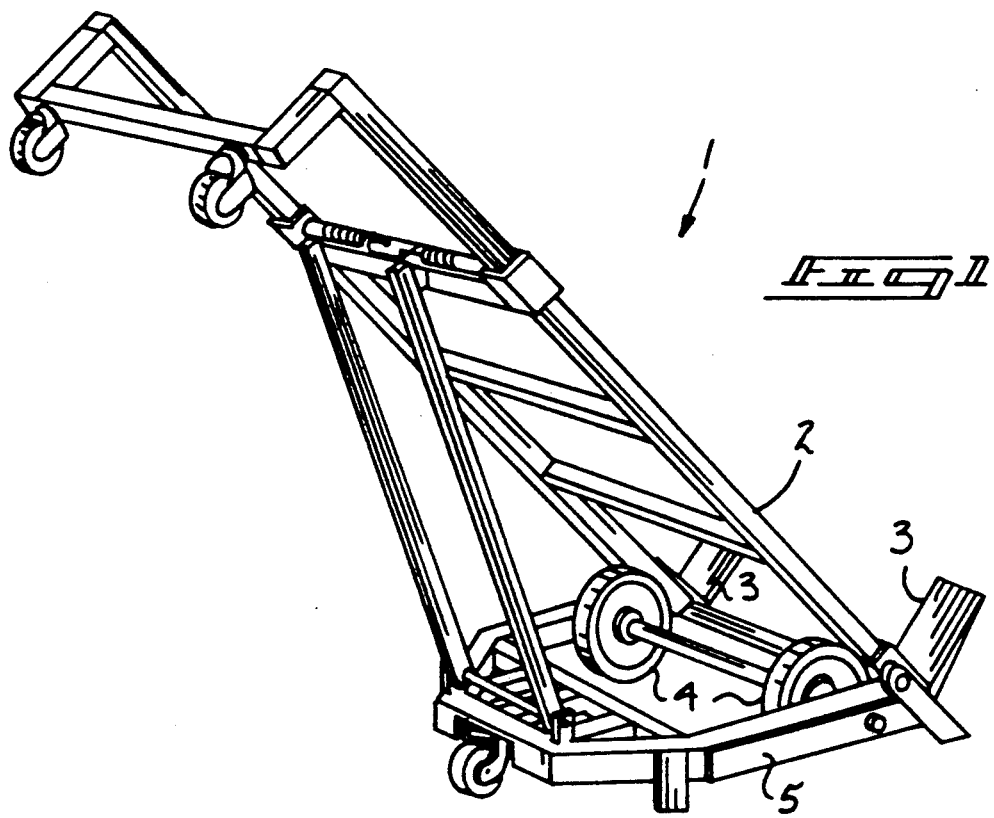
FIG. 1 is an isometric illustration of a prior art hand truck apparatus.

With reference now t the drawings, and in particular to FIGS. 1 to 9 thereof, a new and improved masonry block dolly apparatus embodying the principles and concepts of the present invention and generally designated by the reference numeral 10 will be described.

FIG. 1 is illustrative of a conventional prior art hand truck apparatus 1 comprising a ladder type framework 2 formed with fixedly mounted spaced legs 3 orthogonally directed outwardly from a lowermost portion of the framework 2. Wheels 4 are mounted behind the framework 2 and spaced interiorly thereof. An accessory framework 5 is integrally mounted to a lowermost end of the ladder framework 2 to support a castor wheel rearwardly thereof to accommodate rolling of the hand truck during a transport procedure minimizing weight directed to an individual manipulating the prior art hand truck.

Figure 2:
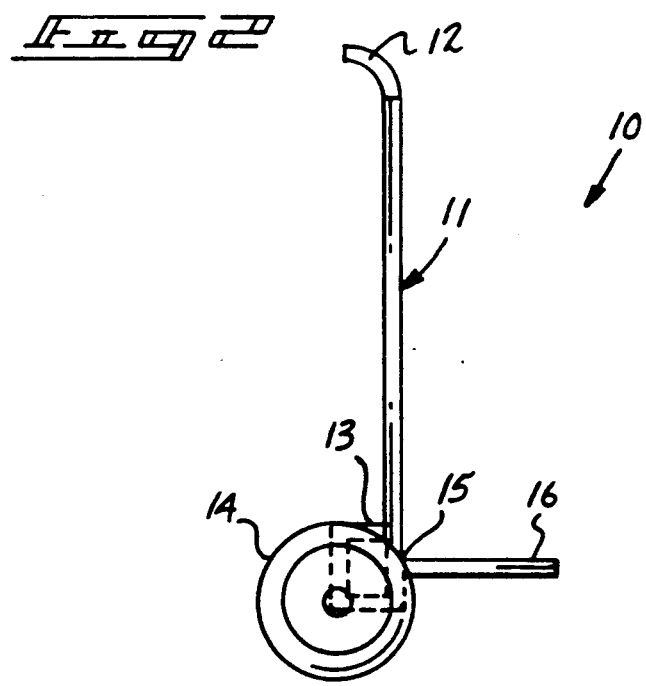
FIG. 2 is an orthographic side view taken in elevation of the instant invention.

More specifically, the masonry block hand truck apparatus 10 of the instant invention essentially comprises a vertical rectangular support framework 11 with a plurality of spaced arcuate handle extensions 12 directed upwardly and orthogonally relative to the framework 11. Spaced wheel support rectangular frameworks 13 are integrally mounted to rear lowermost side surfaces of exterior vertical bars 21 of the framework 11. The wheel support rectangular frameworks 13 include a wheel 14 mounted to a lower rearmost corner of each of the rectangular frameworks 13. The wheels 14 include 4.80×400×8 inch two ply air tires of enlarged configuration and define an external diameter to extend up to but not beyond an intersection 15 defined by the vertical rectangular support framework 11 at its lowermost end, and the first and second tubular support legs 16 and 17 defining a predetermined internal tubular diameter by a hollow tubular configuration, as illustrated in FIGS. 2 and 4 for example. With reference to FIG. 3, the vertical rectangular framework 11 comprises a top support bar 18 spaced from and parallel to an underlying and aligned bottom slotted bar 19 that includes a longitudinal elongate slot 20 mounted through a forward face of the bottom bar 19. The first and second tubular support legs 16 and 17 are slidably adjustable within elongate slot 20, as illustrated in FIG. 6 for example. The first and second legs 16 and 17 include a locking threaded shaft member 20a directed through a top surface of the bottom bar 19 to fixedly secure the legs 16 and 17 in a predetermined orientation relative to one another. The adjustability of the first and second legs 16 and 17 is required to enable interfitting of the legs 16 and 17 within an associated masonry block. Masonry blocks are typically formed with a central web defining two spaced openings, wherein various sizes of such construction blocks require various spacing of the legs 16 and 17 to enable reception of the legs within the aforenoted openings of the masonry block.

The rectangular framework 11 further is defined by a grid of the spaced vertical bars 21, wherein at least four to five such bars are utilized to provide support but yet prevent accumulation of dust and debris from the masonry block transported. As understood from FIG. 3, the rectangular wheel support frameworks 13 are aligned with and mounted to lowermost rear surfaces of the exterior vertical bars 21, wherein they extend below the bottom slotted bar 19 to mount the axis of each wheel 14 in alignment with the bottom bar 19.

Reference to FIGS. 7-9 illustrate the use of a locking frame 22 utilized in combination with the hand truck apparatus, wherein the frame 22 includes a top frame member 23, with an attachment strap 24 mounted medially thereof. A plurality of spaced vertical frame bars extend orthogonally downwardly from the top frame member 23 and are orthogonally secured to a bottom frame bar 25 spaced below and coextensive with the top frame bar 23. The bottom frame bar 25 includes a bottom frame slot 27 mounting a first and second solid cylindrical rod 28 orthogonally relative to a forward face of the bottom frame bar 25. The solid rods 28 and 29 are mounted adjustably within the slot 27 in a manner equal to that as illustrated per FIG. 6. FIG. 7a illustrates that such structure includes each rod integrally and orthogonally mounted to a support block 30 of a complementary configuration to that of an internal cavity defined by the bottom frame bar. Locking threaded shafts 27a are threadedly mounted through a top wall of the bottom frame bar 25 to permit adjustment and sliding of the support block 30 interiorly of the bottom frame bar to subsequently permit locking securement of the support block 30 in a predetermined orientation within the bottom frame bar.

As illustrated in FIG. 9, the vertical frame bars 26 are of a generally flexible memory retentent construction, wherein they are permitted a degree of flexure to surroundingly encompass a stack of masonry blocks "B", with the attachment strap 24 mounted to the top frame bar 23 directed over the block "B" and secured to the top support bar 18 of the rectangular framework 11. In this manner, securement of the masonry block "B" within the hand truck apparatus is assured to prevent inadvertent jarring and necessary destruction of such blocks during transport thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand truck apparatus comprising, in combination, a vertical, rectangular framework including a top frame bar overlying and parallel to a lower frame bar, the lower frame bar including a first and second support leg, each support leg adjustably and orthogonally mounted extending from a forward wall of the lower frame bar, and a first wheel frame spaced from and parallel to a second wheel frame, and the first and second wheel frames mounted rearwardly of the vertical, rectangular framework, and each first and second wheel frame rotatably mounting a respective first and second wheel exteriorly and laterally of each respective first and second wheel frame, and wherein the lower frame bar includes an elongate slot directed through and substantially coextensive with the forward wall of the lower frame bar, and further including a locking member associated with each support leg to block each support leg in a predetermined orientation relative to the slot, and wherein each of the first and second wheel frames is of a generally rectangular configuration and extends below the lower frame bar, and each respective wheel is mounted to a lower rearmost intersection defined by the first and second wheel frame, and each wheel is defined by a predetermined radius, the predetermined radius substantially equal to a distance defined between the lower rearmost intersection, and a further intersection defined by a lower frame bar and each support leg, and further including a locking frame, the locking frame including a top locking frame bar overlying and spaced in a parallel relationship relative to a bottom locking frame bar, the bottom locking frame bar mounted to the top locking frame bar including a plurality of spaced vertical frame bars, the bottom locking frame bar including a bottom frame slot, the bottom frame slot adjustably mounting a first and second solid cylindrical rod extending orthogonally and forwardly of a forward bottom frame bar wall, each first and second rod mounted to a respective block member, each block member slidably mounted interiorly of the bottom locking frame bar, and further including a further locking member associated with each bar to fixedly mount the bar at a predetermined orientation relative to one another.

2. An apparatus as set forth in claim 1 wherein the vertical frame bars are of a flexible memory retentent material to accommodate flexure.

3. An apparatus as set forth in claim 1 wherein the top locking frame bar includes a flexible attachment strap, the flexible attachment strap mounted for securement to the top frame bar of the vertical rectangular framework, wherein each first and second rod is received within each respective first and second support leg.

* * * * *